US012703017B2

(12) United States Patent
Muller

(10) Patent No.: US 12,703,017 B2
(45) Date of Patent: Aug. 11, 2026

(54) MONITORING A HAZARDOUS WASTE REPOSITORY

(71) Applicant: Deep Isolation, Inc., Berkeley, CA (US)

(72) Inventor: Richard A. Muller, Berkeley, CA (US)

(73) Assignee: Deep Isolation, Inc., Berkeley, CA (US)

( * ) Notice: Subject to any disclaimer, the term of this patent is extended or adjusted under 35 U.S.C. 154(b) by 189 days.

(21) Appl. No.: 18/571,651

(22) PCT Filed: Jun. 21, 2022

(86) PCT No.: PCT/US2022/034265

§ 371 (c)(1),
(2) Date: Dec. 18, 2023

(87) PCT Pub. No.: WO2022/271645

PCT Pub. Date: Dec. 29, 2022

(65) Prior Publication Data

US 2024/0278297 A1 Aug. 22, 2024

Related U.S. Application Data

(60) Provisional application No. 63/213,044, filed on Jun. 21, 2021.

(51) Int. Cl.
*B09B 1/00* (2006.01)
*B09B 5/00* (2006.01)
*G21F 9/34* (2006.01)

(52) U.S. Cl.
CPC ................ *B09B 5/00* (2013.01); *B09B 1/008* (2013.01); *G21F 9/34* (2013.01)

(58) Field of Classification Search
CPC .. B09B 5/00; B09B 1/008; B09B 1/00; E21B 41/005; G21F 9/34
See application file for complete search history.

(56) References Cited

U.S. PATENT DOCUMENTS 3,379,013 A 4/1968 Slagle et al.
3,899,631 A 8/1975 Clark
(Continued)

FOREIGN PATENT DOCUMENTS

CN 1973339 5/2007
CN 101124640 2/2008
(Continued)

OTHER PUBLICATIONS

[No Author Listed], "Yucca Mountain cost estimate rises to $96 billion," World Nuclear News, Aug. 6, 2008, 2 pages.
(Continued)

*Primary Examiner* — Carib A Oquendo
(74) *Attorney, Agent, or Firm* — Fish & Richardson P.C.

(57) ABSTRACT

Techniques for monitoring hazardous waste include identifying a hazardous waste drillhole formed from a terranean surface into one or more subterranean formations, the hazardous waste drillhole including an entry sized to receive a plurality of hazardous waste canisters that enclose hazardous waste into and through the entry, and a hazardous waste storage area formed in a storage subterranean formation and sized to receive the plurality of hazardous waste canisters; identifying a probe borehole formed from the terranean surface into the one or more subterranean formations adjacent the hazardous waste drillhole, the probe borehole having a diameter sized insufficiently to receive the plurality of hazardous waste canisters; and measuring, with at least one measurement instrument positioned in the probe borehole near the hazardous waste storage area, at least one parameter associated with the hazardous waste.

30 Claims, 4 Drawing Sheets

(56) References Cited

U.S. PATENT DOCUMENTS

| | | | |
|---|---|---|---|
| 4,708,522 | A | 11/1987 | Bergman et al. |
| 4,886,393 | A | 12/1989 | Jahn-Held et al. |
| 5,133,624 | A | 7/1992 | Cahill |
| 5,165,235 | A | 11/1992 | Nitschke |
| 5,202,522 | A | 4/1993 | Williams |
| 5,318,382 | A | 6/1994 | Cahill |
| 5,340,235 | A | 8/1994 | Milliken |
| 5,377,104 | A | 12/1994 | Sorrells et al. |
| 5,387,741 | A | 2/1995 | Shuttle |
| 5,489,739 | A | 2/1996 | Curry et al. |
| 5,589,603 | A | 12/1996 | Alexander et al. |
| 5,785,133 | A | 7/1998 | Murray et al. |
| 5,850,614 | A | 12/1998 | Crichlow |
| 5,863,283 | A | 1/1999 | Gardes |
| 5,868,210 | A | 2/1999 | Johnson et al. |
| 6,002,063 | A | 12/1999 | Bilak et al. |
| 6,238,138 | B1 | 5/2001 | Crichlow |
| 7,068,748 | B2 | 6/2006 | Singh |
| 7,287,934 | B2 | 10/2007 | Okutsu et al. |
| 8,933,289 | B2 | 1/2015 | Crichlow |
| 9,852,822 | B2 | 12/2017 | Singh |
| 10,002,683 | B2 | 6/2018 | Muller et al. |
| 10,265,743 | B1 | 4/2019 | Muller et al. |
| 10,300,512 | B2 | 5/2019 | Muller et al. |
| 10,315,238 | B1 | 6/2019 | Muller et al. |
| 10,446,287 | B2 | 10/2019 | Singh |
| 10,614,927 | B2 | 4/2020 | Muller et al. |
| 10,861,614 | B2 | 12/2020 | Muller et al. |
| 10,921,301 | B2 | 2/2021 | Muller et al. |
| 10,926,306 | B2 | 2/2021 | Muller et al. |
| 11,135,629 | B2 | 10/2021 | Muller et al. |
| 11,183,313 | B2 | 11/2021 | Crichlow |
| 11,338,337 | B2 | 5/2022 | Muller et al. |
| 2002/0020528 | A1 | 2/2002 | McCabe et al. |
| 2004/0096614 | A1 | 5/2004 | Quigley et al. |
| 2005/0207525 | A1 | 9/2005 | Singh |
| 2008/0039673 | A1 | 2/2008 | Maksimov |
| 2008/0308271 | A1 | 12/2008 | Chouzenoux et al. |
| 2009/0135986 | A1 | 5/2009 | Georgii |
| 2010/0105975 | A1 | 4/2010 | Baird |
| 2010/0234663 | A1 | 9/2010 | Crichlow |
| 2011/0005762 | A1 | 1/2011 | Poole |
| 2011/0054234 | A1 | 3/2011 | Georgii |
| 2012/0235062 | A1* | 9/2012 | Patel ........................ G01T 1/04 250/484.5 |
| 2014/0221722 | A1 | 8/2014 | Germanovich et al. |
| 2016/0258226 | A1 | 9/2016 | Clemens et al. |
| 2017/0186505 | A1* | 6/2017 | Muller .................... G21F 9/304 |
| 2018/0144841 | A1 | 5/2018 | Singh |
| 2018/0182504 | A1 | 6/2018 | Muller et al. |
| 2018/0345336 | A1 | 12/2018 | Muller et al. |
| 2019/0318838 | A1 | 10/2019 | Muller et al. |
| 2020/0023416 | A1 | 1/2020 | Muller et al. |
| 2020/0194140 | A1 | 6/2020 | Payer et al. |
| 2020/0211727 | A1 | 7/2020 | Muller et al. |
| 2020/0271632 | A1 | 8/2020 | Muller et al. |
| 2022/0080481 | A1 | 3/2022 | Muller et al. |

FOREIGN PATENT DOCUMENTS

| | | |
|---|---|---|
| CN | 101971268 | 2/2011 |
| CN | 106782735 | 5/2017 |
| CN | 114486712 | 5/2022 |
| GB | 2104713 | 3/1983 |
| GB | 2151839 | 7/1985 |
| GB | 8512768 | 1/1986 |
| JP | S58-042945 | 3/1983 |
| JP | 2000231000 | 8/2000 |
| JP | 2003028991 | 1/2003 |
| JP | 2005091070 | 4/2005 |
| JP | 2005245261 | 9/2005 |
| JP | 2006035068 | 2/2006 |
| JP | 2006170690 | 6/2006 |
| JP | 4902877 | 1/2012 |
| TW | I484502 | 5/2015 |
| WO | WO 1981/001055 | 4/1981 |
| WO | WO 1992/007667 | 5/1992 |
| WO | WO 2005/012688 | 2/2005 |
| WO | WO 2010/007305 | 1/2010 |
| WO | WO 2010/101713 | 9/2010 |
| WO | WO-2010101713 A2 * | 9/2010 ............ E21B 47/117 |
| WO | WO 2015/069300 | 5/2015 |
| WO | WO 2016/138389 | 9/2016 |
| WO | WO 2016/177876 | 11/2016 |
| WO | WO 2017/112479 | 6/2017 |

OTHER PUBLICATIONS

Arnold, et al., “Reference Design and Operations of Deep Borehole Disposal of High-Level Radioactive Waste—SAND2011-6749,” Sandia National Laboratories, Oct. 2011, 67 pages.

Cornwall, “Deep Sleep. Boreholes drilled into Earth’s crust get a fresh look for nuclear waste disposal,” Science, Jul. 10, 2015, 349(6244):132-135.

Dozier, “Feasibility of Very Deep Borehole Disposal of US Nuclear Defense Wastes,” Thesis for the degree of Master of Science in Nuclear Science and Engineering, Massachusetts Institute of Technology, Sep. 2011, 176 pages.

European Search Report in European Appln No. 22829119.1, mailed on Apr. 22, 2024, 10 pages.

Faybishenko et al., “International Approaches for Deep Geological Disposal of Nuclear Waste: Geological Challenges in Radioactive Waste Isolation,” Lawrence Berkeley National Laboratory and Sandia National Laboratories: prepared for the US Department of Energy, Fifth Worldwide Review, Dec. 2016, 474 pages.

Gibb et al., “A Model for Heat Flow in Deep Borehole Disposals of High-Level Nuclear Waste,” Journal of Geophysical Research, May 6, 2008, 113(B5):1-18.

Gibbs, “Feasibility of Lateral Emplacement in Very Deep Borehole Disposal of High Level Nuclear Waste,” Thesis for the degrees of Naval Engineering and Nuclear Engineering, Massachusetts Institute of Technology, Jun. 2010, 154 pages.

Hoag, “Canister Design for Deep Borehole Disposal of Nuclear Waste,” Thesis for the degree of Master of Science in Nuclear Science and Engineering, Massachusetts Institute of Technology, May 2006, 125 pages.

Hurd, “Choosing and Using A Form Release Agent,” Concrete Construction, 1996, 41(10):732-736.

International Preliminary Report on Patentability in International Appl. No. PCT/US2022/034265, mailed Jan. 4, 2024, 6 pages.

International Preliminary Report on Patentability in International Appln. No. PCT/US2020/019225, mailed Sep. 2, 2021, 8 pages.

International Search Report and Written Opinion in International Appln. No. PCT/US2018/035974, mailed Aug. 24, 2018, 13 pages.

International Search Report and Written Opinion in International Appln. No. PCT/US2020/019225, mailed Oct. 27, 2020, 13 pages.

International Search Report and Written Opinion in International Appln. No. PCT/US2022/034265, mailed Nov. 16, 2022, 11 pages.

International Search Report and Written Opinion in International Appln. No. PCT/US2023/034812, mailed Mar. 1, 2024, 20 pages.

International Search Report and Written Opinion issued in International Application No. PCT/US2016/066539, mailed on Apr. 19, 2017, 13 pages.

Latimes.com [online], “Decades-old war over Yucca Mountain nuclear dump resumes under Trump budget plan,” Mar. 29, 2017, retrieved on Dec. 19, 2019, retrieved from URL<https://www.latimes.com/local/california/la-na-yucca-revival-20170329-story.html>, 4 pages.

Neuzil, “Can Shale Safely Host U.S. Nuclear Waste?” EOS, Jul. 23, 2013, 94(30):1-3.

Office Action in Chinese Appln. No. 2018-80049476, mailed Dec. 11, 2020, 9 pages (with English translation).

Office Action in Japanese Appln. No. 2018-552636, mailed Apr. 27, 2021, 7 pages (with English Translation).

Office Action in Korean Appln. No. 10-2020-7000246, mailed Dec. 14, 2021, 7 pages (with English Translation).

(56) References Cited

OTHER PUBLICATIONS

Office Action in Taiwanese Appln. No. 107119231, mailed Dec. 23, 2021, 109 pages (with English Translation).
Sone et al., "Mechanical properties of shale-gas reservoir rocks—Part 1: Static and dynamic elastic properties and anisotropy," Geophysics, Sep.-Oct. 2013, 78(5):D381-392.
Thebulletin.org [online], "Shale: An overlooked option for US nuclear waste disposal," Nov. 2014, retrieved on Aug. 23, 2018, retrieved from URL<http://thebulletin .org/shale-overlooked-option-us-nuclear-waste-disposal7831>, 5 pages.
Thomson, "Performance Confirmation Concepts Study Report," Civilian Radioactive Waste Management System Management & Operating Contractor TRW, Nov. 22, 1996, 331 pages.
U.S. Nuclear Waste Technical Review Board, "A Report To the U.S. Congress and the Secretary of Energy, Evaluation of Technical Issues Associated With the Development of a Separate Repository for U.S. Department of Energy-Managed High-Level Radioactive Waste and Spent Nuclear Fuel," NWTRB, 2015, available at URL: <http://www.nwtrb.gov/reports/disposal_options.pdf>, 30 pages.
United States Department of Energy, "Executive Summary—Environmental Impact Statement, Waste Isolation Pilot Plant (WIPP)," Oct. 1980, 1544 pages.
United States Department of Energy, "Quality Assurance Program Document, DOE/CBFO-94-1012 Revision 13," Carlsbad Field Office, Apr. 20, 2017, 127 pages.
United States Department of Energy, "Safety Evaluation Report Addendum for Annual Update of Waste Isolation Plant, Document Safety Analysis, Revision 6, and Technical Safety Requirements, Revision 6," mailed Feb. 26, 2018, 55 pages.
United States Department of Energy, "Safety Evaluation Report for Approval of DOE/WIPP 07-3372, Waste Isolation Plant Documented Safety Analysis, Revision 5 and DOE/WIPP 07-3373, Waste Isolation Pilot Plant Technical Safety Requirements, Revision 5," mailed Apr. 29, 2016, 235 pages.
United States Department of Energy, "Waste Isolation Pilot Plant, Environmental Monitoring Plan, Revision 10," mailed Jun. 22, 2017, 56 pages.
United States Department of Energy, "Waste Isolation Plant, Documented Safety Analysis," Nuclear Waste Partnership LLC Carlsbad, NM, mailed Feb. 2018, 777 pages.
United States Department of Energy, "Waste Isolation Plant, Final Supplement, Environmental Impact Statement," mailed Jan. 1990, 1498 pages.
United States Department of Energy, "Waste Isolation Plant, Final Technical Safety Requirements," Nuclear Waste Partnership LLC Carlsbad, NM, mailed Feb. 2018, 291 pages.
Winterle et al., "Regulatory Perspectives on Deep Borehole Disposal Concepts," prepared for the U.S. Nuclear Regulatory Commission, Contract NRC-02-07006, Center for Nuclear Waste Regulatory Analyses, San Antonio, TX, May 2011, 24 pages.
YuccaMountain.org [online], "Eureka County, Nevada—Nuclear Waste Office, FAQ," Mar. 17, 2017, retrieved on Dec. 17, 2019, retrieved from URL<https://www.yuccamountain.org/>, 12 pages.

* cited by examiner 100
146
136
142
138
130
110
126
126
126
112
114
116
118
138
138
102
104
106
134
130
120
122
108

MONITORING A HAZARDOUS WASTE REPOSITORY

CROSS-REFERENCE TO RELATED APPLICATIONS

This application is a National Phase Application under 35 U.S.C. § 371 of International Patent Application No. PCT/US2022/034265, filed on Jun. 21, 2022, which claims priority to U.S. Provisional Patent Application Ser. No. 63/213,044, filed on Jun. 21, 2021. The contents of all prior applications are incorporated herein by reference in their entireties.

TECHNICAL FIELD

This disclosure relates to monitoring a hazardous waste repository in a subterranean formation and, more particularly, monitoring a hazardous waste repository formed in one or more drillholes in a subterranean formation.

BACKGROUND

Hazardous waste is often placed in long-term, permanent, or semi-permanent storage so as to prevent health issues among a population living near the stored waste. Such hazardous waste storage is often challenging, for example, in terms of storage location identification and surety of containment. For instance, the safe storage of nuclear waste (e.g., spent nuclear fuel, whether from commercial power reactors, test reactors, or even military waste) is considered to be one of the outstanding challenges of energy technology. Safe storage of the long-lived radioactive waste is a major impediment to the adoption of nuclear power in the United States and around the world. Conventional waste storage methods have emphasized the use of tunnels, and is exemplified by the design of the *Yucca* Mountain storage facility. Other techniques include boreholes, including vertical boreholes, drilled into crystalline basement rock. Other conventional techniques include forming a tunnel with boreholes emanating from the walls of the tunnel in shallow formations to allow human access.

SUMMARY

In an example implementation, a hazardous waste repository monitoring system includes a hazardous waste drillhole formed from a terranean surface into one or more subterranean formations. The hazardous waste drillhole includes an entry sized to receive a plurality of hazardous waste canisters that enclose hazardous waste into and through the entry, and a hazardous waste storage area formed in a storage subterranean formation and sized to receive the plurality of hazardous waste canisters. The system includes a probe borehole formed from the terranean surface into the one or more subterranean formations adjacent the hazardous waste drillhole. The probe borehole has a diameter sized insufficiently to receive the plurality of hazardous waste canisters. The system includes at least one measurement instrument positioned in the probe borehole near the hazardous waste storage area and configured to measure at least one parameter associated with the hazardous waste.

In an aspect combinable with the example implementation, the probe borehole is separated from the hazardous waste drillhole by the storage subterranean formation.

In another aspect combinable with any of the previous aspects, the parameter includes at least one of radioactivity, heat energy, pressure, temperature, salinity, or pH.

In another aspect combinable with any of the previous aspects, the hazardous waste includes radioactive waste.

In another aspect combinable with any of the previous aspects, the radioactive waste includes spent nuclear fuel.

In another aspect combinable with any of the previous aspects, the probe borehole is separated from the hazardous waste drillhole by a predetermined distance or close to the predetermined distance.

In another aspect combinable with any of the previous aspects, the predetermined distance is selected such that a radiation level from the radioactive waste at the at least at least one measurement instrument is insufficient to damage the at least one measurement device over a particular time duration.

In another aspect combinable with any of the previous aspects, the at least one measurement instrument includes at least one scintillation detector, at least one ionization chamber, at least one proportional detector, or at least one Geiger detector.

In another aspect combinable with any of the previous aspects, the probe borehole includes a diameter between 10-20 cm.

In another aspect combinable with any of the previous aspects, the probe borehole includes an open hole completion.

In another aspect combinable with any of the previous aspects, the probe borehole is open at the terranean surface.

In another aspect combinable with any of the previous aspects, the at least one measurement instrument is coupled to a downhole conveyance from the terranean surface.

In another aspect combinable with any of the previous aspects, the downhole conveyance includes a support and communications wire.

In another example implementation, a method for monitoring hazardous waste includes identifying a hazardous waste drillhole formed from a terranean surface into one or more subterranean formations, the hazardous waste drillhole including an entry sized to receive a plurality of hazardous waste canisters that enclose hazardous waste into and through the entry, and a hazardous waste storage area formed in a storage subterranean formation and sized to receive the plurality of hazardous waste canisters; identifying a probe borehole formed from the terranean surface into the one or more subterranean formations adjacent the hazardous waste drillhole, the probe borehole having a diameter sized insufficiently to receive the plurality of hazardous waste canisters; and measuring, with at least one measurement instrument positioned in the probe borehole near the hazardous waste storage area, at least one parameter associated with the hazardous waste.

In an aspect combinable with the example implementation, the probe borehole is separated from the hazardous waste drillhole by the storage subterranean formation.

In another aspect combinable with any of the previous aspects, the parameter includes at least one of radioactivity, heat energy, pressure, temperature, salinity, or pH.

In another aspect combinable with any of the previous aspects, the hazardous waste includes radioactive waste.

In another aspect combinable with any of the previous aspects, the radioactive waste includes spent nuclear fuel.

In another aspect combinable with any of the previous aspects, the probe borehole is separated from the hazardous waste drillhole by a predetermined distance or by a distance close to a predetermined value.

In another aspect combinable with any of the previous aspects, the predetermined distance is selected such that a radiation level from the radioactive waste at the at least at least one measurement instrument is insufficient to damage the at least one measurement device over a particular time duration.

In another aspect combinable with any of the previous aspects, the at least one measurement instrument includes at least one scintillation detector, at least one ionization chamber, at least one proportional detector, or at least one Geiger detector.

In another aspect combinable with any of the previous aspects, the probe borehole includes a diameter between 10-20 cm.

In another aspect combinable with any of the previous aspects, the probe borehole includes an open hole completion.

In another aspect combinable with any of the previous aspects, the probe borehole is open at the terranean surface.

In another aspect combinable with any of the previous aspects, the at least one measurement instrument is coupled to a downhole conveyance from the terranean surface.

In another aspect combinable with any of the previous aspects, the downhole conveyance includes a support and communications wire.

Another aspect combinable with any of the previous aspects further includes forming the hazardous waste drillhole from the terranean surface into one or more subterranean formations and into the storage subterranean formation.

Another aspect combinable with any of the previous aspects further includes forming the probe borehole from the terranean surface into one or more subterranean formations and into the storage subterranean formation.

Another aspect combinable with any of the previous aspects further includes moving the at least one measurement instrument from the terranean surface into the probe borehole and to the storage subterranean formation.

Implementations of a hazardous material storage bank according to the present disclosure may also include one or more of the following features. Large storage volumes, in turn, allow for the storage of hazardous materials to be emplaced without a need for complex prior treatment, such as concentration or transfer to different forms or canisters. As a further example, in the case of nuclear waste material from a reactor for instance, the waste can be kept in its original pellets, unmodified, or in its original fuel rods, or in its original fuel assemblies, which contain dozens of fuel rods. In another aspect, the hazardous material may be kept in an original holder but a cement or other material is injected into the holder to fill the gaps between the hazardous materials and the structure. For example, if the hazardous material is stored in fuel rods which are, in turn, stored in fuel assemblies, then the spaces between the rods (typically filled with water when inside a nuclear reactor) could be filled with cement or other material to provide yet an additional layer of isolation from the outside world. As yet a further example, secure and low cost storage of hazardous material is facilitated while still permitting retrieval of such material if circumstances deem it advantageous to recover the stored materials.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
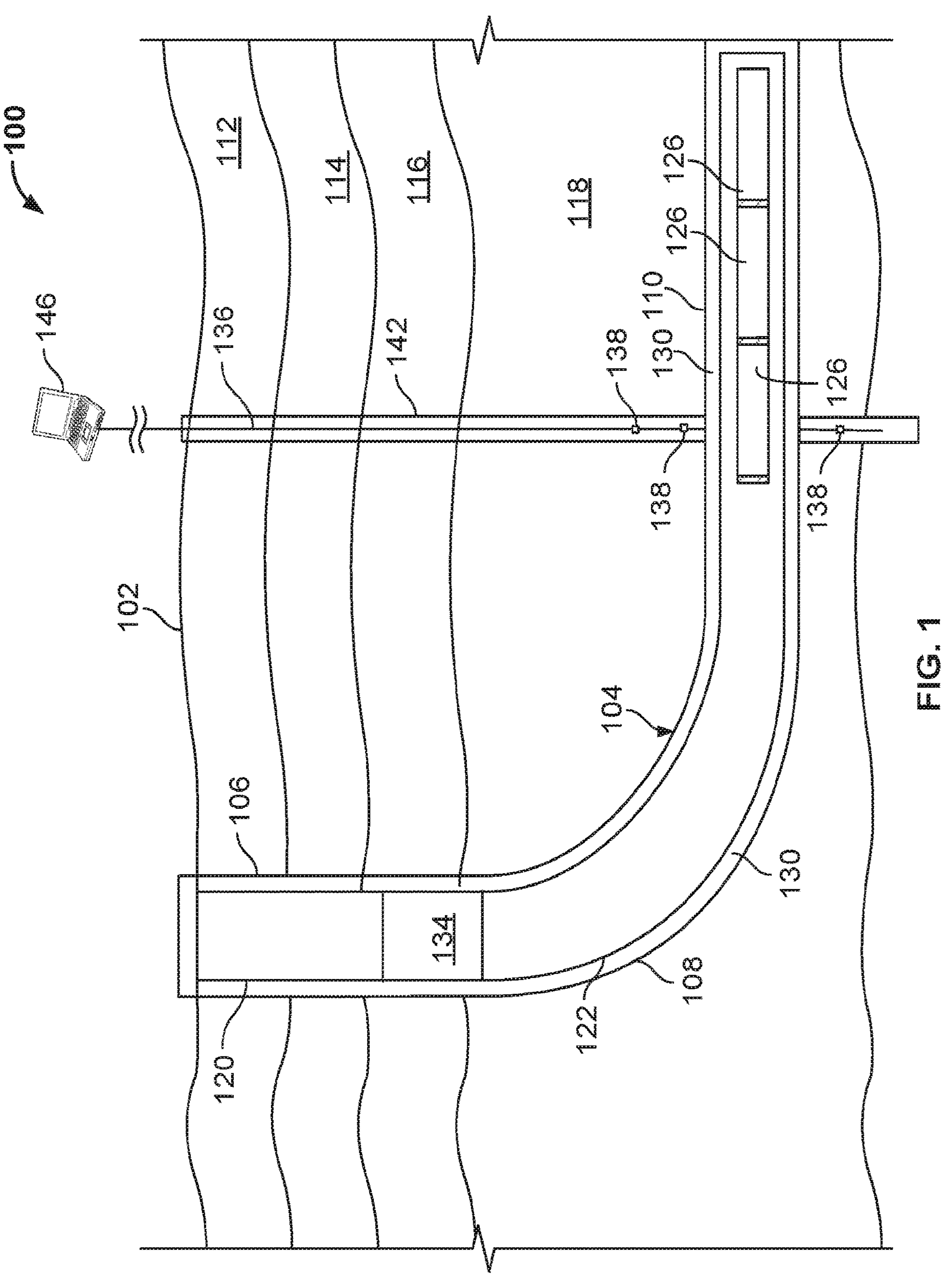
FIG. 1 is a schematic illustration of an example implementation of a hazardous waste repository during storage and monitoring operations from a probe borehole according to the present disclosure.

Hazardous waste, such as radioactive waste (e.g., spent nuclear fuel, high level waste, transuranic (TRU) waste, and other waste) can be disposed (permanently or for a certain period of time) in one or more canisters in a hazardous waste repository formed in one or more deep, directional drillholes (e.g., wellbores or boreholes). Each drillhole is formed from a terranean surface and extends through one or more subterranean formation and lands (e.g., as a horizontal drillhole) in a particular subterranean formation (e.g., shale, salt, crystalline basement rock, or other formation). The drillholes can be drilled as conventional wells, which are unoccupiable by humans (unlike conventional waste repositories that are mined).

Such directional drillholes often include horizontal drillhole portions formed at a depth between 1 and 3 km and include a hazardous waste storage portion (or area), that is typically near the ends of the respective horizontal drillhole portions (opposite their connections to vertical portions). Such hazardous waste storage portion can also be called disposal regions. These disposal regions can be tens to thousands of meters long. Nuclear waste such as spent nuclear fuel (SNF) and other toxic materials can be placed in the disposal regions (for example, within hazardous waste canister). When the waste is in place, there can be value in monitoring key parameters of the nearby rock formations, including temperature, radioactivity, pressure, pH, salinity, oxygen content, chemical composition of water, and other aspects of the nearby subterranean rock formation into which the horizontal drillhole portion is formed. However, for nuclear waste, the high radiation level, and particularly the high intensity of gamma rays, can be detrimental to standard monitoring instruments. For example, radiation can damage electronics and reduce the capability of fiber optics by darkening their optical pathways. These effects can make measurements within the disposal borehole difficult or impossible. Some devices and cables can be made "radiation hardened," meaning that they suffer less damage from radiation than other devices and cables, but the current-state-of-the-art in radiation hardening does not make devices and cables that would survive more than a few months or years (when such radioactive waste can be stored and monitored for 10s, 100s, or even 1000s of years).

Even if an instrument could be made radiation hard, there is another limitation. That is the fact that the device measures the key quantities, they do it only at a location within the disposal borehole. It can be valuable to have measurements made at a variety of distances from the stored waste, so that potential leakage into and diffusion through the subterranean rock formation can be detected and measured. As another example, heat changes could be mapped as a function of distance from the stored waste. Although the present disclosure describes implementations with respect to stored radioactive waste, alternative implementations of monitoring waste can be used for other types of toxic waste, such as nerve or biological agents.

The present disclosure describes methods and systems for monitoring waste stored in directional drillholes in which conditions close to the drillhole (e.g., a few meters) are monitored rather than, for example, conditions within or very close (e.g., inches) to the drillhole. For example, in some aspects, conditions a few meters from the disposal region can be fundamental to human safety, because conditions at that distance can be indicative of movement of the waste out of the repository, or changes in the condition of the rock that could allow such movement to occur in the future. Such measurements can be possibly even more important than are the closer measurements. For example, if radiation increases with time at a distance a few meters from the disposal region, then that could indicate that leakage has occurred. Measurements of temperature in this region can show if the calculations of temperature rise are occurring as expected. Changes in the pH and salinity of the water can indicate flow of water, a potential source of leakage.

Example implementations according to the present disclosure can include one or more probe boreholes that places measurement instruments, or probes, (e.g., coupled to a conductor that extends to the surface, such as a support and communications wire) at or to locations that are at known distances from the disposal region. Because the instruments can be deployed in a relatively small diameter borehole (e.g., 10 to 20 centimeters in diameter) and itself cannot receive or hold hazardous waste canisters, the probe borehole is not highly expensive. If desired, more than one can probe borehole can be placed. The borehole can be left open or filled with an easily removable material (such as sand or gravel) during the period of measurements, since computer calculations show that a narrow hole does not offer a substantial fast-path for toxic materials to reach the surface. Instruments can be left in the probe borehole, or can be removed and reinserted later.

The present disclosure further describes a hazardous waste repository, which includes one or more drillholes formed into a subterranean zone to provide long-term (e.g., tens, hundreds, or even thousands of years) storage of hazardous material (e.g., biological, chemical, nuclear, or otherwise) in one or more underground storage volumes storage canisters. The subterranean zone includes multiple subterranean layers having different geological formations and properties. The storage canisters may be deposited in a particular subterranean layer based on one or more geologic properties of that layer, such as low permeability, sufficient thickness, low brittleness, and other properties. In some aspects, the particular subterranean layer comprises a shale formation, which forms an isolative seal between the storage canisters and another subterranean layer that comprises mobile water.

FIG. 1 is schematic illustrations of example implementations of a hazardous waste repository, e.g., a subterranean location for the long-term (e.g., tens, hundreds, or thousands of years or more) but retrievable safe and secure storage of hazardous material, during a deposit or retrieval operation according to the present disclosure. For example, this figure illustrates an example hazardous waste repository 100 once one or more hazardous waste canisters 126 have been moved into a hazardous waste repository formed in a drillhole 104 (e.g., wellbore or borehole) and such repository is being monitored from a probe borehole 142 with one or more (and usually many) sensors 138). As illustrated, the hazardous waste repository 100 includes a drillhole 104 formed (e.g., drilled or otherwise) from a terranean surface 102 and through multiple subterranean layers 112, 114, 116, and 118. Although the terranean surface 102 is illustrated as a land surface, terranean surface 102 may be a sub-sea or other underwater surface, such as a lake or an ocean floor or other surface under a body of water. Thus, the present disclosure contemplates that the drillhole 104 may be formed under a body of water from a drilling location on or proximate the body of water.

The illustrated drillhole 104 is a directional drillhole in this example of hazardous waste repository 100. For instance, the drillhole 104 includes a substantially vertical portion 106 coupled to a radiussed or curved portion 108, which in turn is coupled to a substantially horizontal portion 110. As used in the present disclosure, "substantially" in the context of a drillhole orientation, refers to drillholes that may not be exactly vertical (e.g., exactly perpendicular to the terranean surface 102) or exactly horizontal (e.g., exactly parallel to the terranean surface 102). In other words, those of ordinary skill in the drill arts would recognize that vertical drillholes often undulate offset from a true vertical direction, that they might be drilled at an angle that deviates from true vertical, and horizontal drillholes often undulate offset from a true horizontal direction. Further, the substantially horizontal portion 110, in some aspects, may be a slant drillhole or other directional drillhole that is oriented between exactly vertical and exactly horizontal. Further, the substantially horizontal portion 110, in some aspects, may be a slant drillhole or other directional well bore that is oriented to follow the slant of the formation. As illustrated in this example, the three portions of the drillhole 104—the vertical portion 106, the radiussed portion 108, and the horizontal portion 110—form a continuous drillhole 104 that extends into the Earth.

The illustrated drillhole 104 has a surface casing 120 positioned and set around the drillhole 104 from the terranean surface 102 into a particular depth in the Earth. For example, the surface casing 120 may be a relatively large-diameter tubular member (or string of members) set (e.g., cemented) around the drillhole 104 in a shallow formation. As used herein, "tubular" may refer to a member that has a circular cross-section, elliptical cross-section, or other shaped cross-section. For example, in this implementation of the hazardous waste repository 100, the surface casing 120 extends from the terranean surface through a surface layer 112. The surface layer 112, in this example, is a geologic layer comprised of one or more layered rock formations. In some aspects, the surface layer 112 in this example may or may not include freshwater aquifers, salt water or brine sources, or other sources of mobile water (e.g., water that moves through a geologic formation). In some aspects, the surface casing 112 may isolate the drillhole 104 from such mobile water, and may also provide a hanging location for other casing strings to be installed in the drillhole 104. Further, although not shown, a conductor casing may be set above the surface casing 112 (e.g., between the surface casing 112 and the surface 102 and within the surface layer 112) to prevent drilling fluids from escaping into the surface layer 112.

As illustrated, a production casing 122 is positioned and set within the drillhole 104 downhole of the surface casing 120. Although termed a "production" casing, in this example, the casing 122 may or may not have been subject to hydrocarbon production operations. Thus, the casing 122 refers to and includes any form of tubular member that is set (e.g., cemented) in the drillhole 104 downhole of the surface casing 120. In some examples of the hazardous waste repository 100, the production casing 122 may begin at an end of the radiussed portion 108 and extend throughout the substantially horizontal portion 110. The casing 122 could also extend into the radiussed portion 108 and into the vertical portion 106.

As shown, cement 130 is positioned (e.g., pumped) around the casings 120 and 122 in an annulus between the casings 120 and 122 and the drillhole 104. The cement 130, for example, may secure the casings 120 and 122 (and any other casings or liners of the drillhole 104) through the subterranean layers under the terranean surface 102. In some aspects, the cement 130 may be installed along the entire length of the casings (e.g., casings 120 and 122 and any other casings), or the cement 130 could be used along certain portions of the casings if adequate for a particular drillhole 104. The cement 130 can also provide an additional layer of confinement for the hazardous material in canisters 126.

The drillhole 104 and associated casings 120 and 122 may be formed with various example dimensions and at various example depths (e.g., true vertical depth, or TVD). For instance, a conductor casing (not shown) may extend down to about 120 feet TVD, with a diameter of between about 28 in. and 60 in. The surface casing 120 may extend down to about 2500 feet TVD, with a diameter of between about 22 in. and 48 in. An intermediate casing (not shown) between the surface casing 120 and production casing 122 may extend down to about 8000 feet TVD, with a diameter of between about 16 in. and 36 in. The production casing 122 may extend substantially horizontally (e.g., to case the substantially horizontal portion 110) with a diameter of between about 11 in. and 22 in. The foregoing dimensions are merely provided as examples and other dimensions (e.g., diameters, TVDs, lengths) are contemplated by the present disclosure. For example, diameters and TVDs may depend on the particular geological composition of one or more of the multiple subterranean layers (112-118), particular drilling techniques, as well as a size, shape, or design of a hazardous material canister 126 that contains hazardous material to be deposited in the hazardous waste repository 100. In some alternative examples, the production casing 122 (or other casing in the drillhole 104) could be circular in cross-section, elliptical in cross-section, or some other shape.

As illustrated, the drillhole 104 extends through subterranean layers 112, 114, and 116, and lands in subterranean layer 118. As discussed above, the surface layer 112 may or may not include mobile water. Subterranean layer 114, which is below the surface layer 112, in this example, is a mobile water layer 114. For instance, mobile water layer 114 may include one or more sources of mobile water, such as freshwater aquifers, salt water or brine, or other source of mobile water. In this example of hazardous waste repository 100, mobile water may be water that moves through a subterranean layer based on a pressure differential across all or a part of the subterranean layer. For example, the mobile water layer 114 may be a permeable geologic formation in which water freely moves (e.g., due to pressure differences or otherwise) within the layer 114. In some aspects, the mobile water layer 114 may be a primary source of human-consumable water in a particular geographic area. Examples of rock formations of which the mobile water layer 114 may be composed include porous sandstones and limestones, among other formations.

Below the mobile water layer 114, in this example implementation of hazardous waste repository 100, is an impermeable layer 116. The impermeable layer 116, in this example, may not allow mobile water to pass through. Thus, relative to the mobile water layer 114, the impermeable layer 116 may have low permeability, e.g., on the order of nanodarcy permeability. Additionally, in this example, the impermeable layer 116 may be a relatively non-ductile (i.e., brittle) geologic formation. One measure of non-ductility is brittleness, which is the ratio of compressive stress to tensile strength. In some examples, the brittleness of the impermeable layer 116 may be between about 20 MPa and 40 MPa.

As shown in this example, the impermeable layer 116 is shallower (e.g., closer to the terranean surface 102) than the storage layer 119. In this example rock formations of which the impermeable layer 116 may be composed include, for example, certain kinds of sandstone, mudstone, clay, and slate that exhibit permeability and brittleness properties as described above. In alternative examples, the impermeable layer 116 may be deeper (e.g., further from the terranean surface 102) than the storage layer 119. In such alternative examples, the impermeable layer 116 may be composed of an igneous rock, such as granite.

Below the impermeable layer 116 is a storage layer 118. The storage layer 118, in this example, may be chosen as the landing for the substantially horizontal portion 110, which stores the hazardous material, for several reasons. Relative to the impermeable layer 116 or other layers, the storage layer 118 may be thick, e.g., between about 100 and 200 feet of total vertical thickness. Thickness of the storage layer 118 may allow for easier landing and directional drilling, thereby allowing the substantially horizontal portion 110 to be readily emplaced within the storage layer 118 during constructions (e.g., drilling). If formed through an approximate horizontal center of the storage layer 118, the substantially horizontal portion 110 may be surrounded by about 50 to 100 feet of the geologic formation that comprises the storage layer 118. Further, the storage layer 118 may also have no mobile water, e.g., due to a very low permeability of the layer 118 (e.g., on the order of milli- or nanodarcys). In addition, the storage layer 118 may have sufficient ductility, such that a brittleness of the rock formation that comprises the layer 118 is between about 3 MPa and 10 MPa. Examples of rock formations of which the storage layer 118 may be composed include: shale and anhydrite. Further, in some aspects, hazardous material may be stored below the storage layer, even in a permeable formation such as sandstone or limestone, if the storage layer is of sufficient geologic properties to isolate the permeable layer from the mobile water layer 114.

In some examples implementations of the hazardous waste repository 100, the storage layer 118 is composed of shale. Shale, in some examples, may have properties that fit within those described above for the storage layer 118. For example, shale formations may be suitable for a long-term confinement of hazardous material (e.g., in the hazardous material canisters 126), and for their isolation from mobile water layer 114 (e.g., aquifers) and the terranean surface 102. Shale formations may be found relatively deep in the Earth, typically 3000 feet or greater, and placed in isolation below any fresh water aquifers.

Shale formations, for instance, may include geologic properties that enhance the long-term (e.g., thousands of years) isolation of material. Such properties, for instance, have been illustrated through the long term storage (e.g., tens of millions of years) of hydrocarbon fluids (e.g., gas, liquid, mixed phase fluid) without escape of such fluids into surrounding layers (e.g., mobile water layer 114). Indeed, shale has been shown to hold natural gas for millions of years or more, giving it a proven capability for long-term storage of hazardous material. Example shale formations (e.g., Marcellus, Eagle Ford, Barnett, and otherwise) has stratification that contains many redundant sealing layers that have been effective in preventing movement of water, oil, and gas for millions of years, lacks mobile water, and can be expected (e.g., based on geological considerations) to seal hazardous material (e.g., fluids or solids) for thousands of years after deposit.

Shale formations may also be at a suitable depth, e.g., between 3000 and 12,000 feet TVD. Such depths are typically below ground water aquifer (e.g., surface layer 112 and/or mobile water layer 114). Further, the presence of soluble elements in shale, including salt, and the absence of these same elements in aquifer layers, demonstrates a fluid isolation between shale and the aquifer layers.

Another particular quality of shale that may advantageously lend itself to hazardous material storage is its clay content, which, in some aspects, provides a measure of ductility greater than that found in other, impermeable rock formations (e.g., impermeable layer 116). For example, shale may be stratified, made up of thinly alternating layers of clays (e.g., between about 20-30% clay by volume) and other minerals. Such a composition may make shale less brittle and, thus less susceptible to fracturing (e.g., naturally or otherwise) as compared to rock formations in the impermeable layer (e.g., granite or otherwise). For example, rock formations in the impermeable layer 116 may have suitable permeability for the long term storage of hazardous material, but are too brittle and commonly are fractured. Thus, such formations may not have sufficient sealing qualities (as evidenced through their geologic properties) for the long term storage of hazardous material.

The present disclosure contemplates that there may be many other layers between or among the illustrated subterranean layers 112, 114, 116, and 118. For example, there may be repeating patterns (e.g., vertically), of one or more of the mobile water layer 114, impermeable layer 116, and storage layer 118. Further, in some instances, the storage layer 118 may be directly adjacent (e.g., vertically) the mobile water layer 114, i.e., without an intervening impermeable layer 116.

The hazardous waste canisters 126 can be emplaced through a deposit operation into the horizontal portion 110 of the drillhole 104. For example, a work string (e.g., tubing, coiled tubing, wireline, or otherwise) can be extended into the cased drillhole 104 to place one or more (three shown but there may be more or less) hazardous material canisters 126 into long term, but in some aspects, retrievable, storage in the portion 110. A work string may include a downhole tool that couples to the canister 126, and with each trip into the drillhole 104, the downhole tool may deposit a particular hazardous material canister 126 in the substantially horizontal portion 110.

The downhole tool may couple to the canister 126 by, in some aspects, a threaded connection. In alternative aspects, the downhole tool may couple to the canister 126 with an interlocking latch, such that rotation of the downhole tool may latch to (or unlatch from) the canister 126. In alternative aspects, the downhole tool may include one or more magnets (e.g., rare Earth magnets, electromagnets, a combination thereof, or otherwise) which attractingly couple to the canister 126. In some examples, the canister 126 may also include one or more magnets (e.g., rare Earth magnets, electromagnets, a combination thereof, or otherwise) of an opposite polarity as the magnets on the downhole tool. In some examples, the canister 126 may be made from or include a ferrous or other material attractable to the magnets of the downhole tool.

As another example, each canister 126 may be positioned within the drillhole 104 by a drillhole tractor (e.g., on a wireline or otherwise), which may push or pull the canister into the substantially horizontal portion 110 through motorized (e.g., electric) motion. As yet another example, each canister 126 may include or be mounted to rollers (e.g., wheels), so that the downhole tool may push the canister 126 into the cased drillhole 104.

Each canister 126 may enclose hazardous material. Such hazardous material, in some examples, may be biological or chemical waste or other biological or chemical hazardous material. In some examples, the hazardous material may include nuclear material, such as spent nuclear fuel recovered from a nuclear reactor (e.g., commercial power or test reactor) or military nuclear material. For example, a gigawatt nuclear plant may produce 30 tons of spent nuclear fuel per year. The density of that fuel is typically close to 10 (10 $gm/cm^3$=10 kg/liter), so that the volume for a year of nuclear waste is about 3 $m^3$. Spent nuclear fuel, in the form of nuclear fuel pellets, may be taken from the reactor and not modified. Nuclear fuel pellets are solid, and emit very little gas other than short-lived tritium (13 year half-life).

In some aspects, the storage layer 118 should be able to contain any radioactive output (e.g., gases) within the layer 118, even if such output escapes the canisters 126. For example, the storage layer 118 may be selected based on diffusion times of radioactive output through the layer 118. For example, a minimum diffusion time of radioactive output escaping the storage layer 118 may be set at, for example, fifty times a half-life for any particular component of the nuclear fuel pellets. Fifty half-lives as a minimum diffusion time would reduce an amount of radioactive output by a factor of $1\times10^{-15}$. As another example, setting a minimum diffusion time to thirty half-lives would reduce an amount of radioactive output by a factor of one billion.

For example, plutonium-239 is often considered a dangerous waste product in spent nuclear fuel because of its long half-life of 24,100 years. For this isotope, 50 half-lives would be 1.2 million years. Plutonium-239 has low solubility in water, is not volatile, and as a solid is not capable of diffusion through a matrix of the rock formation that comprises the illustrated storage layer 118 (e.g., shale or other formation). The storage layer 118, for example comprised of shale, may offer the capability to have such isolation times (e.g., millions of years) as shown by the geological history of containing gaseous hydrocarbons (e.g., methane and otherwise) for several million years. In contrast, in conventional nuclear material storage methods, there was a danger that some plutonium might dissolve in a layer that comprised mobile ground water upon confinement escape.

In some aspects, the drillhole 104 may be formed for the primary purpose of long-term storage of hazardous materials. In alternative aspects, the drillhole 104 may have been previously formed for the primary purpose of hydrocarbon production (e.g., oil, gas). For example, storage layer 118 may be a hydrocarbon bearing formation from which hydrocarbons were produced into the drillhole 104 and to the terranean surface 102. In some aspects, the storage layer 118 may have been hydraulically fractured prior to hydrocarbon production. Further in some aspects, the production casing 122 may have been perforated prior to hydraulic fracturing. In such aspects, the production casing 122 may be patched (e.g., cemented) to repair any holes made from the perforating process prior to a deposit operation of hazardous material. In addition, any cracks or openings in the cement between the casing and the drill hole can also be filled at that time.

For example, in the case of spent nuclear fuel as a hazardous material, the drillhole 104 may be formed at a particular location, e.g., near a nuclear power plant, as a new drillhole provided that the location also includes an appropriate storage layer 118, such as a shale formation. Alternatively, an existing well that has already produced shale gas, or one that was abandoned as "dry," (e.g., with sufficiently low organics that the gas in place is too low for commercial development), may be selected as the drillhole 104. In some aspects, prior hydraulic fracturing of the storage layer 118 through the drillhole 104 may make little difference in the hazardous material storage capability of the drillhole 104. But such a prior activity may also confirm the ability of the storage layer 118 to store gases and other fluids for millions of years. If, therefore, the hazardous material or output of the hazardous material (e.g., radioactive gasses or otherwise) were to escape from the canister 126 and enter the fractured formation of the storage layer 118, such fractures may allow that material to spread relatively rapidly over a distance comparable in size to that of the fractures. In some aspects, the drillhole 104 may have been drilled for a production of hydrocarbons, but production of such hydrocarbons had failed, e.g., because the storage layer 118 comprised a rock formation (e.g., shale or otherwise) that was too ductile and difficult to fracture for production, but was advantageously ductile for the long-term storage of hazardous material.

As shown, FIG. 1 illustrates the hazardous waste repository 100 in a long term storage and monitoring One or more hazardous material canisters 126 are positioned in the substantially horizontal portion 110 of the drillhole 104. A seal 134 is placed in the drillhole 104 between the location of the canisters 126 in the substantially horizontal portion 110 and an opening of the substantially vertical portion 106 at the terranean surface 102 (e.g., a well head). In this example, the seal 134 is placed at an uphole end of the substantially vertical portion 108. Alternatively, the seal 134 may be positioned at another location within the substantially vertical portion 106, in the radiussed portion 108, or even within the substantially horizontal portion 110 uphole of the canisters 126. In some aspects, the seal 134 may be placed at least deeper than any source of mobile water, such as the mobile water layer 114, within the drillhole 104. In some aspects, the seal 134 may be formed substantially along an entire length of the substantially vertical portion 106.

In this example, sensors 138 are positioned within a probe borehole 142 that is formed separately from the drillhole 104. The probe borehole 142 may be a cased or an uncased borehole, through which the cable 136 may extend between the monitoring control system 146 and the sensors 138. In this example, the probe borehole 142 bottoms out above the substantially horizontal portion 110 but within the storage layer 118. Thus, the sensors 138 may record data (e.g., radiation levels, temperature, acidity, seismic activity) of the storage layer 118. In alternative aspects, the probe borehole 142 may bottom out below the storage layer 118, above the storage layer in the impermeable layer 116, or in other layers. Further, although shown placed in the probe borehole 142 at a level adjacent the storage layer 118, sensors 138 may be placed anywhere within the probe borehole 142. Alternatively, the probe borehole 142 may, in some aspects, be constructed prior to drillhole 104, thereby permitting monitoring by installed sensors 138 during construction of the drillhole 104. Also, the monitoring borehole 142 could be sealed to prevent the possibility that material that leaks into borehole 142 would have a path to the terranean surface 102.

As illustrated, the seal 134 fluidly isolates the volume of the substantially horizontal portion 110 that stores the canisters 126 from the opening of the substantially vertical portion 106 at the terranean surface 102. Thus, any hazardous material (e.g., radioactive material) that does escape the canisters 126 may be sealed (e.g., such that liquid, gas, or solid hazardous material) does not escape the drillhole 104. The seal 134, in some aspects, may be a cement plug or other plug, that is positioned or formed in the drillhole 104. As another example, the seal 134 may be formed from one or more inflatable or otherwise expandable packers positioned in the drillhole 104.

Prior to a retrieval operation, the seal 134 may be removed. For example, in the case of a cement or other permanently set seal 134, the seal 134 may be drilled through or otherwise milled away. In the case of semi-permanent or removable seals, such as packers, the seal 134 may be removed from the drillhole 104 through a conventional process as is known.

As shown, the sensors 138 may monitor one or more variables, such as, for example, radiation levels, temperature, pressure, presence of oxygen, a presence of water vapor, a presence of liquid water, acidity, seismic activity, or a combination thereof. Data values related to such variables may be transmitted along the cable 136 to the monitoring control system 146. The monitoring control system 146, in turn, may record the data, determine trends in the data (e.g., rise of temperature, rise of radioactive levels), send data to other monitoring locations, such as national security or environmental center locations, and may further automatically recommend actions (e.g., retrieval of the canisters 126) based on such data or trends. For example, a rise in temperature or radioactive level in the drillhole 104 above a particular threshold level may trigger a retrieval recommendation, e.g., to ensure that the canisters 126 are not leaking radioactive material. In some aspects, there may be a one-to-one ratio of sensors 138 to canisters 126. In alternative aspects, there may be multiple sensors 138 per canister 126, or there may be fewer.

Referring generally to FIG. 1, the example hazardous waste repository 100 may provide for multiple layers of containment to ensure that a hazardous material (e.g., biological, chemical, nuclear) is sealingly stored in an appropriate subterranean layer. In some example implementations, there may be at least twelve layers of containment. In alternative implementations, a fewer or a greater number of containment layers may be employed. First, using spent nuclear fuel as an example hazardous material, the fuel pellets are taken from the reactor and not modified. They may be made from sintered uranium dioxide ($UO_2$), a ceramic, and may remain solid and emit very little gas other than short-lived tritium. Unless the pellets are exposed to extremely corrosive conditions or other effects that damage the multiple layers of containment, most of the radioisotopes (including the tritium) will be contained in the pellets. Second, the fuel pellets are surrounded by the zircaloy tubes of the fuel rods, just as in the reactor. As described, the tubes could be mounted in the original fuel assemblies, or removed from those assemblies for tighter packing. Third, the tubes are placed in the sealed housings of the hazardous material canister. The housing may be a unified structure or multi-panel structure, with the multiple panels (e.g., sides, top, bottom) mechanically fastened (e.g., screws, rivets, welds, and otherwise). Fourth, a material (e.g., solid or fluid) may fill the hazardous material canister to provide a further buffer between the material and the exterior of the canister. Fifth, the hazardous material canister(s) are positioned (as described above), in a drillhole that is lined with a steel or other sealing casing that extends, in some examples, throughout the entire drillhole (e.g., a substantially vertical portion, a radiussed portion, and a substantially horizontal portion). The casing is cemented in place, providing a relatively smooth surface (e.g., as compared to the drillhole wall) for the hazardous material canister to be moved through, thereby reducing the possibility of a leak or break during deposit or retrieval. Sixth, the cement that holds or helps hold the casing in place, may also provide a sealing layer to contain the hazardous material should it escape the canister. Seventh, the hazardous material canister is stored in a portion of the drillhole (e.g., the substantially horizontal portion) that is positioned within a thick (e.g., 100-200 feet) seam of a rock formation that comprises a storage layer. The storage layer may be chosen due at least in part to the geologic properties of the rock formation (e.g., no mobile water, low permeability, thick, appropriate ductility or non-brittleness). For example, in the case of shale as the rock formation of the storage layer, this type of rock may offers a level of containment since it is known that shale has been a seal for hydrocarbon gas for millions of years. The shale may contain brine, but that brine is demonstrably immobile, and not in communication with surface fresh water. Eighth, in some aspects, the rock formation of the storage layer may have other unique geological properties that offer another level of containment. For example, shale rock often contains reactive components, such as iron sulfide, that reduce the likelihood that hazardous materials (e.g., spent nuclear fuel and its radioactive output) can migrate through the storage layer without reacting in ways that reduce the diffusion rate of such output even further. Further, the storage layer may include components, such as clay and organic matter, that typically have extremely low diffusivity. For example, shale may be stratified and composed of thinly alternating layers of clays and other minerals. Such a stratification of a rock formation in the storage layer, such as shale, may offer this additional layer of containment. Ninth, the storage layer may be located deeper than, and under, an impermeable layer, which separates the storage layer (e.g., vertically) from a mobile water layer. Tenth, the storage layer may be selected based on a depth (e.g., 3000 to 12,000 ft.) of such a layer within the subterranean layers. Such depths are typically far below any layers that contain mobile water, and thus, the sheer depth of the storage layer provides an additional layer of containment. Eleventh, example implementations of the hazardous waste repository of the present disclosure facilitate monitoring of the stored hazardous material. For example, if monitored data indicates a leak or otherwise of the hazardous material (e.g., change in temperature, radioactivity, or otherwise), or even tampering or intrusion of the canister, the hazardous material canister may be retrieved for repair or inspection. Twelfth, the one or more hazardous material canisters may be retrievable for periodic inspection, conditioning, or repair, as necessary (e.g., with or without monitoring). Thus, any problem with the canisters may be addressed without allowing hazardous material to leak or escape from the canisters unabated.

Figure 2:
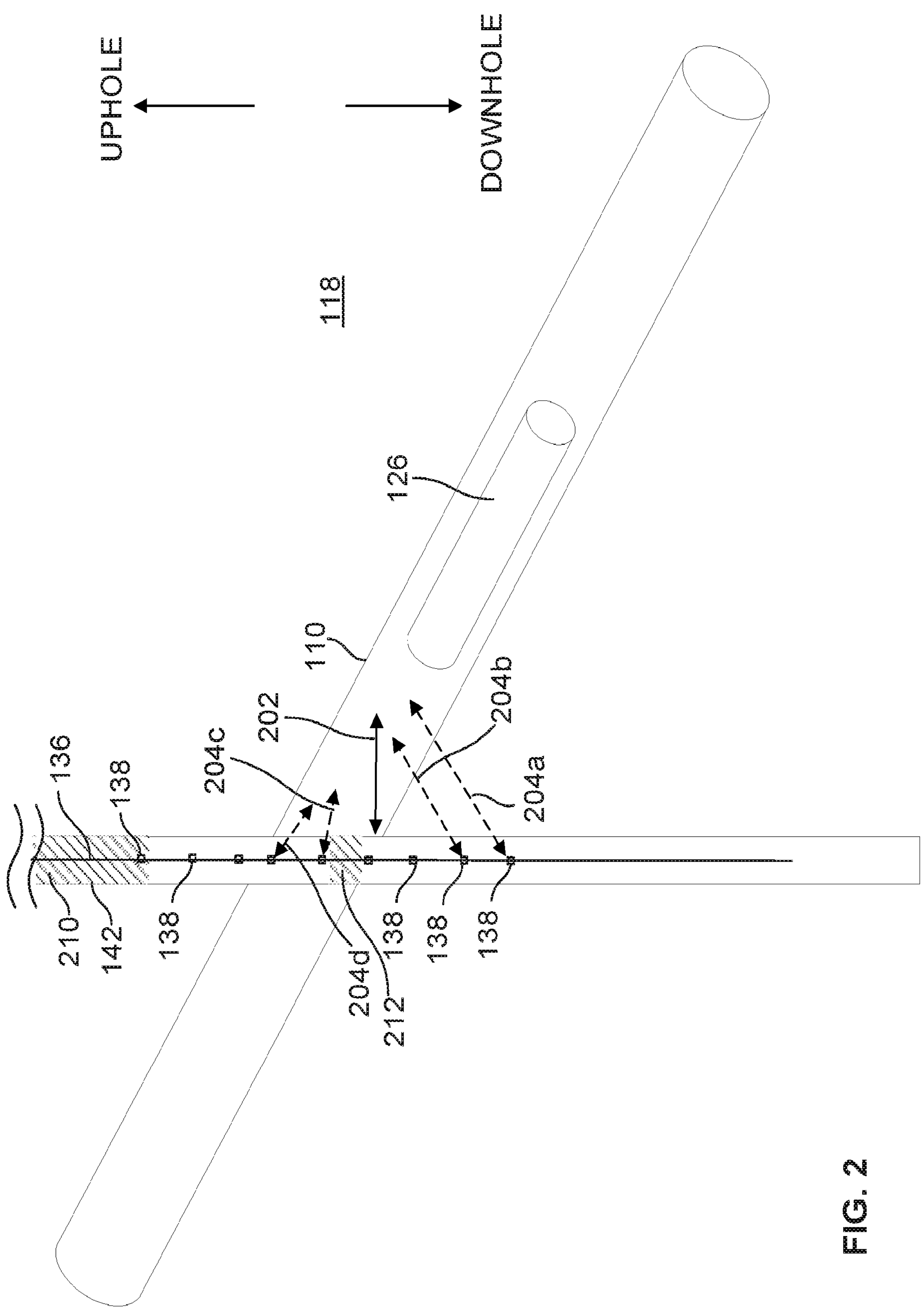
FIG. 2 is another schematic illustration of a portion of an example implementation of a hazardous waste repository during monitoring operations from a probe borehole according to the present disclosure.

FIG. 2 shows another view of the horizontal drillhole portion 110 with an example hazardous waste canister 126 placed therein. At least a portion of probe borehole 142 is shown extending substantially vertically adjacent (but not intersecting) the horizontal drillhole portion 110 in the subterranean formation 118. In this example, the disposal region of the drillhole portion 110 into which hazardous waste canister 126 is emplaced can be horizontal or nearly horizontal. The probe borehole 142 is formed that passes close to the disposal region, but in this example, the probe borehole 142 does not intersect that disposal drillhole (i.e., directional drillhole 104). As shown, a distance 202 represents a closest approach of the probe borehole 142 to horizontal drillhole portion 110.

In some aspects, distance 202 is chosen such that at the closest approach, the radiation level in the probe borehole 142 is sufficiently attenuated by passage through the intervening subterranean rock formation 118 that ordinary or state-of-the-art hardened instruments would be operable for extended periods of time, such as years or longer (even in the presence of the radiation from the radioactive waste stored in the drillhole). For example, because the probe borehole 142 is separated from the horizontal drillhole portion 110 by rock in subterranean formation 118, the radiation and heat are lower than they are at the disposal borehole surface. Thus, the distance 202 can be chosen to reduce these phenomena to the level that standard radiation hardening is sufficient to allow the instruments to function for an extended time. In some aspects, it may not be required to form the probe borehole 142 (or directional drillhole 104, or both) in such a way such that distance 202 is precisely matched to a precisely pre-determined value, since the passage of the probe borehole 142 past the drillhole 104 proves a large range of distances. Rock absorbs gamma rays, so the radiation level in the probe borehole 142 can be less than that in the drillhole 104 (i.e., the horizontal drillhole portion 110). A typical value for crystalline rock (e.g., $SiO_2$) can be a ten times reduction for every 28 cm, i.e., about ten times reduction for each foot. Thus, a meter of rock will reduce the gamma ray intensity by about one thousand times. By choosing the distance of closest approach (distance 202 in FIG. 2), the radiation level can be reduced to the point that normally hardened electronics, scintillators and fibers will not be significantly degraded in their performances.

If a closer distance 202 is used and the instruments fail, then they can be replaced in the probe borehole 142. This is possible because the disposal regions of the horizontal drillhole portion 110 need not be disturbed in any way that might compromise safety or adherence to regulations. Replacement of sensors 138 (or probes 138) can be done even if the probe borehole 142 has been sealed, by drilling it out and replacing the instruments. But in example implementations, the probe borehole 142 can be left open (e.g., at the surface and/or as an "open hole" completion) or it can be filled with easily removable material (e.g., sand or gravel) once it is demonstrated (e.g., with calculations and computer simulations) that the probe borehole 142 in the subterranean rock formation 118 of the disposal site does not offer a sufficiently fast path to the terranean surface 102 for the hazardous material to offer a threat to the public.

In example implementations, sections of the probe borehole 142 between the instruments can be open, but in other implementations they can be sealed. Sealing can be done with a material 210 such as sand, with gravel or other easily removable material 210, with plugs or with expanders that impede a flow of fluid and gases between such sections. If necessary, radiation shields 212 e.g., (rock, sand, tungsten, lead, depleted uranium, or other gamma ray absorbing material) can be placed between the probes 138 in the probe borehole 142 to assure that radiation will not move easily up and down the probe borehole 142. In a similar way, other probes can be used to determine temperature as a function of distance from the disposal region, as well as other parameters of interest.

Sensors 138 can be placed at several positions along this probe borehole 142. Since there can be differing amounts of rock (e.g., different distances) between the directional drillhole 104 and the probes 138, the probes 138 provide information that can be used to give a measure of radiation absorption in the rock. For example, as shown certain probes 138 are located respective distances 204_a_-204_d_ from the horizontal drillhole portion 110. Each of the distances 204_a_-204_d_ is different due to the different position of the respective probe 138 on the cable 136 that extends through the probe borehole 142. Thus, each of these respective probes 138 (with which a particular distance 204_a_-204_d_ is associated) has a different amount of rock between it and the horizontal drillhole portion 110 (and thus the hazardous, e.g., radioactive, waste in the hazardous waste canisters 126).

Although FIG. 2 shows the probe borehole 142 perpendicular to the horizontal drillhole portion 110, other implementations can include a probe borehole 142 (or more than one probe boreholes 142) that are not perpendicular to the horizontal drillhole portion 110. The probe borehole 142 could be tilted, or even curved from directional drilling. The directional drillhole 104 could similarly be slanted, vertical, or curved by directional drilling. Sensors 138 that can be used include scintillation detectors, ionization chambers, proportional detectors, Geiger detectors, and other electronic and optical instruments capable of measuring radiation. As noted, other sensors (e.g., temperature, pressure, salinity, etc.) can also be used along with or in place of the radiation detectors.

Figure 3:
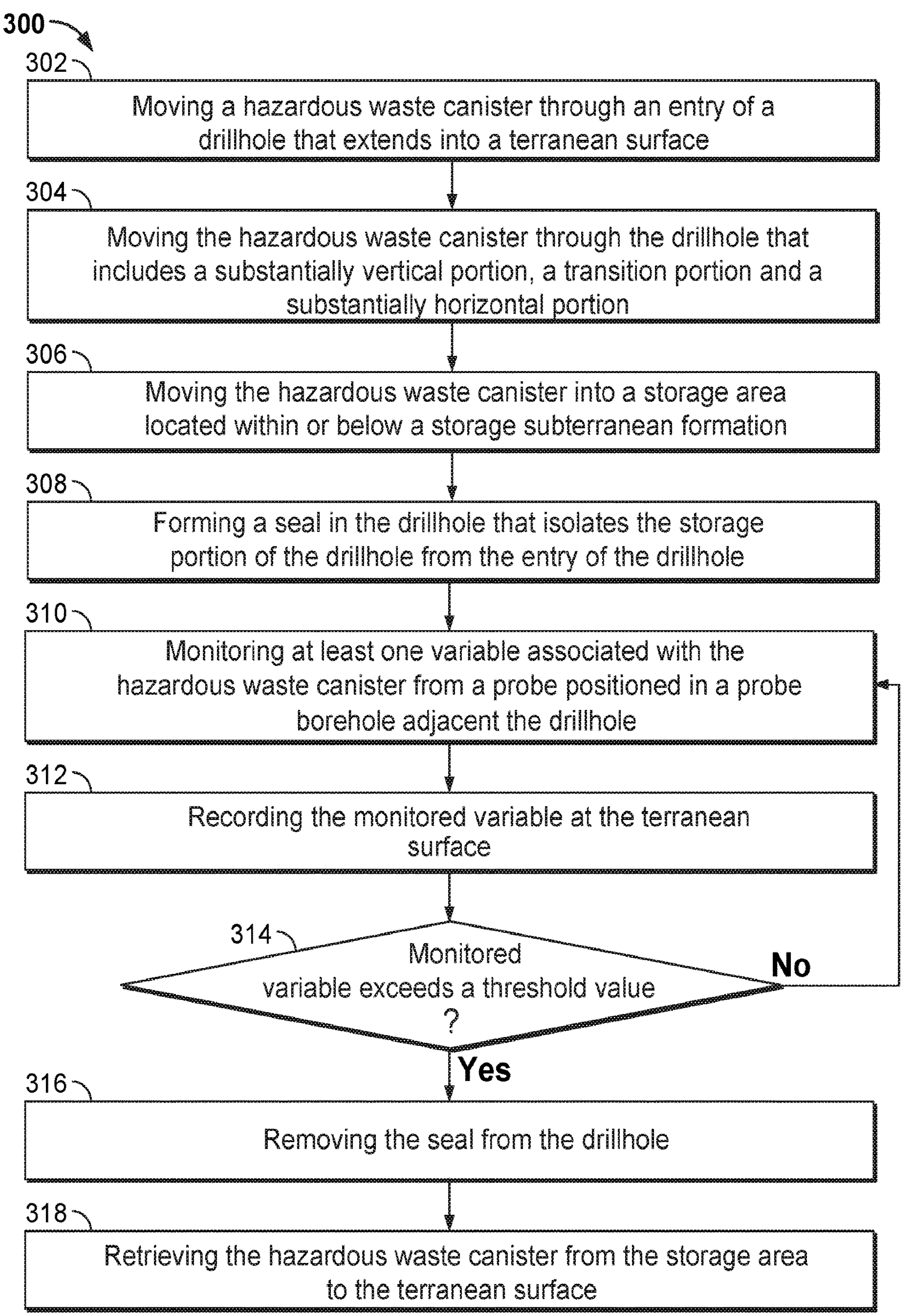
FIG. 3 is a flowchart that illustrates an example method associated with monitoring hazardous waste in a hazardous waste repository according to the present disclosure.

FIG. 3 is a flowchart that illustrates example method 300 associated with monitoring hazardous material. Turning to method 300, this example method for storing hazardous material may be performed with or by, e.g., hazardous waste repository 100 as described with reference to FIGS. 1 and 2. Alternatively, method 300 may be performed by another hazardous waste repository in accordance with the present disclosure.

Method 300 may begin at step 302, which includes moving a hazardous waste canister through an entry of a drillhole that extends into a terranean surface. The hazardous waste canister encloses a hazardous material, such as chemical, biological, or nuclear waste, or another hazardous material. In some aspects, the hazardous waste canister may be positioned in the entry directly from a mode of transportation (e.g., truck, train, rail, or otherwise) which brought the hazardous material to the site of the drillhole. In some aspects, a packaging of the hazardous material during transport is not removed for movement of the storage canister into the entry. In some aspects, such transport packaging is only removed as the hazardous waste canister fully enters the drillhole.

Method 300 may continue at step 304, which includes moving the hazardous waste canister through the drillhole that includes a substantially vertical portion, a transition portion, and a substantially horizontal portion. In some aspects, the drillhole is a directional, or slant drillhole. The hazardous waste canister may be moved through the drillhole in a variety of manners. For example, a tool string (e.g., tubular work string) or wireline may include a downhole tool that couples to the storage canister and moves (e.g., pushes) the storage canister from the entry to the horizontal portion of the drillhole. As another example, the hazardous waste canister may ride on rails installed in the drillhole, e.g., a cased drillhole. As yet another example, the hazardous waste canister may be moved through the drillhole with a drillhole tractor (e.g., motored or powered tractor). In another example, the tractor could be built as part of the hazardous waste canister. As yet a further example, the hazardous waste canister may be moved through the drillhole with a fluid (e.g., gas or liquid) circulated through the drillhole.

Method 300 may continue at step 306, which includes moving the hazardous waste canister into a storage area located within or below a storage subterranean formation. In some aspects, the storage subterranean formation may include one or more geologic qualities that provide for a fluidic seal (e.g., gas and liquid) against the escape of any hazardous material beyond the shale formation (e.g., vertically or horizontally). For example, the storage subterranean formation of the storage area may be relatively impermeable, with permeability values less than 0.001 millidarcys (and even down to nanodarcys). As another example, the storage subterranean formation may be ductile, having a brittleness of less than about 10 MPa so as to prevent or help prevent fracturing that can allow hazardous material leaks therethrough. Brittleness, as used herein in example implementations, is the ratio of compressive stress of the storage subterranean formation to tensile strength of the rock formation. As another example, the storage subterranean formation may be relatively thick, with thickness proximate the storage area of between about 100 and 200 feet (although less thick and more thick formations are also contemplated by the present disclosure). As another example, the storage subterranean formation may be composed of clay or other organic material, e.g., of about 20-30% weight by volume, to help ductility.

Method 300 may continue at step 308, which includes forming a seal in the drillhole that isolates the storage portion of the drillhole from the entry of the drillhole. For example, once the hazardous waste canister is moved into the storage area (or after all hazardous waste canister s are moved into the storage area), a seal may be formed in the drillhole. The seal may be a cement plug, an inflatable seal (e.g., packer), or other seal or combination of such seals. In some aspects, the seal is removable so as to facilitate a subsequent retrieval operation of the hazardous waste canister.

Method 300 may continue at step 310, which includes monitoring at least one variable associated with the hazardous waste canister from a probe positioned in a probe borehole formed adjacent to (but not intersecting) the drillhole. The variable may include one or more of temperature, radioactivity, seismic activity, oxygen, water vapor, acidity, or other variable that indicates a presence of the hazardous material (e.g., within the drillhole, outside of the hazardous waste canister, in the rock formation, or otherwise). In some aspects, one or more probes may be positioned in the probe borehole. For example, in some aspects, the probes and probe borehole can be implemented as shown in FIG. 2.

Method 300 may continue at step 312, which includes recording the monitored variable at the terranean surface. For example, variable data received at the one or more probes may be transmitted (e.g., on a conductor or wirelessly) to a monitoring system (e.g., control system 146) at the terranean surface. The monitoring system may perform a variety of operations. For example, the monitoring system may record a history of one or more of the monitored variables. The monitoring system may provide trend analysis in the recorded variable data. As another example, the monitoring system may include one or more threshold limits for each of the monitored variables, and provide an indication when such threshold limits are exceeded.

Method 300 may continue at step 312, which includes determining whether the monitored variable exceeds a threshold value. For example, the one or more sensors may monitor radioactivity in the drillhole, e.g., an amount of radiation released by the hazardous material, whether in alpha or beta particles, gamma rays, x-rays, or neutrons. The sensors, for instance, may determine an amount of radioactivity, in units of measure of curie (Ci) and/or becquerel (Bq), rads, grays (Gy), or other units of radiation. Monitored variables can also include heat energy, pressure, temperature, salinity, or pH. If the monitored variable does not exceed a threshold value that, for example, would indicate a large leak of hazardous nuclear material from the hazardous waste canister, then the method 300 may return to step 310.

If the determination is "yes," method 300 may continue at step 316, which includes removing the seal from the drillhole. For example, in some aspects, once a threshold value (or values) is exceeded, a retrieval operation may be initiated by removing the seal. In alternative aspects, exceeding of a threshold value may not automatically trigger a retrieval operation or removal of the drillhole seal. In some aspects, there may be multiple monitored variables, and a "yes" determination is only made if all monitored variables exceed their respective threshold values. Alternatively, a "yes" determination may be made if at least one monitored variable exceeds its respective threshold value.

Method 300 may continue at step 318, which includes retrieving the hazardous waste canister from the storage area to the terranean surface. For example, once the seal is removed (e.g., drilled through or removed to the terranean surface), the work string may be tripped into the drillhole to remove the hazardous waste canister (or canisters) for inspection, repair, or otherwise. In some aspects, rather than removing the seal from the drillhole to retrieve the hazardous waste canister, other remedial measures may be taken. For example, if the determination is "yes" in step 314, rather than recovering the hazardous material, a decision might be made to improve the seal. This could be done, for example, by injecting a cement or other sealant into the borehole to fill the space previously filled with gas.

Figure 4:
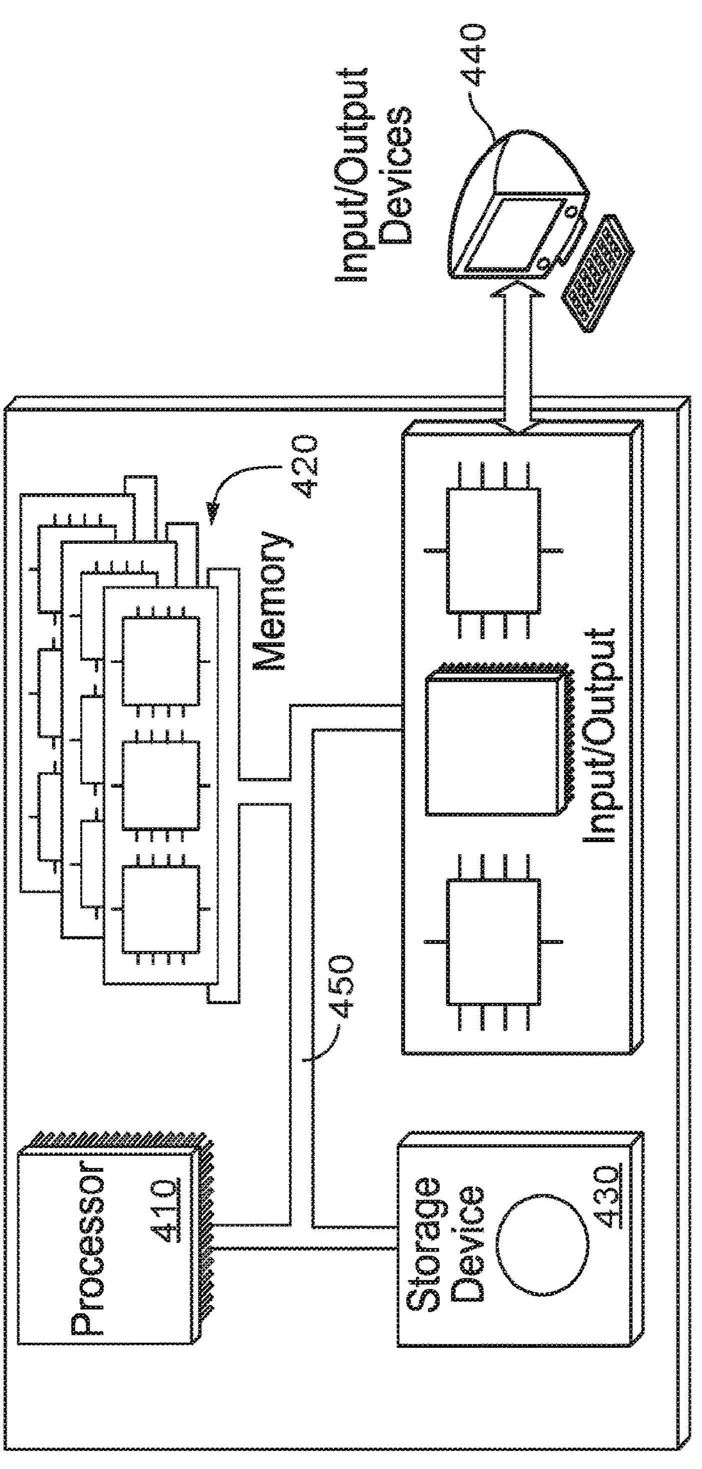
FIG. 4 is a schematic illustration of a controller or control system for monitoring a hazardous waste repository according to the present disclosure.

FIG. 4 is a schematic illustration of an example controller 400 (or control system) for or as part of the monitoring control system 146. For example, the controller 400 may be communicably coupled with, or as a part of, a hazardous waste repository as described herein.

The controller 400 is intended to include various forms of digital computers, such as printed circuit boards (PCB), processors, digital circuitry, or otherwise that is part of a vehicle. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 400 includes a processor 410, a memory 420, a storage device 430, and an input/output device 440. Each of the components 410, 420, 430, and 440 are interconnected using a system bus 450. The processor 410 is capable of processing instructions for execution within the controller 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the controller 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the controller 400. In one implementation, the storage device 430 is a computer-readable medium. In various different implementations, the storage device 430 may be a floppy disk device, a hard disk device, an optical disk device, a tape device, flash memory, a solid state device (SSD), or a combination thereof.

The input/output device 440 provides input/output operations for the controller 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A hazardous waste repository monitoring system, comprising:

a hazardous waste drillhole formed from a terranean surface into one or more subterranean formations, the hazardous waste drillhole comprising an entry sized to receive a plurality of hazardous waste canisters that enclose radioactive hazardous waste into and through the entry, and a hazardous waste storage area formed in a storage subterranean formation and sized to receive the plurality of hazardous waste canisters;

a probe borehole formed from the terranean surface into the one or more subterranean formations adjacent the hazardous waste drillhole, the probe borehole having a diameter that is less than a diameter of each of the plurality of hazardous waste canisters; and a plurality of radiation measurement instruments positioned in the probe borehole near the hazardous waste storage area and configured to measure at least one parameter associated with the radioactive hazardous waste;

at least one radiation shield positioned in the probe borehole between adjacent radiation measurement instruments and configured to impede a movement of radiation between the adjacent radiation measurement instruments, wherein:

the probe borehole is separated from the hazardous waste drillhole by a predetermined distance in the storage subterranean formation that defines a closest approach distance between the hazardous waste drillhole and the probe borehole, the closest approach distance defining an amount of attenuation of radiation from the radioactive hazardous waste between the hazardous waste drillhole and the probe borehole based on the storage subterranean formation.

2. The hazardous waste repository monitoring system of claim 1, wherein the parameter comprises at least one of radioactivity, heat energy, pressure, temperature, salinity, or pH.

3. The hazardous waste repository monitoring system of claim 1, wherein the radioactive hazardous waste comprises high level waste or transuranic (TRU) waste.

4. The hazardous waste repository monitoring system of claim 1, wherein the radioactive hazardous waste comprises spent nuclear fuel.

5. The hazardous waste repository monitoring system of claim 1, wherein the predetermined distance is selected such that a radiation level from the radioactive hazardous waste at the particular radiation measurement instrument is insufficient to damage the particular radiation measurement device over a particular time duration.

6. The hazardous waste repository monitoring system of claim 1, wherein the particular radiation measurement instrument comprises at least one scintillation detector, at least one ionization chamber, at least one proportional detector, or at least one Geiger detector.

7. The hazardous waste repository monitoring system of claim 1, wherein the probe borehole comprises a diameter between 10-20 cm.

8. The hazardous waste repository monitoring system of claim 1, wherein the probe borehole comprises an open hole completion.

9. The hazardous waste repository monitoring system of claim 1, wherein the probe borehole is open at the terranean surface.

10. The hazardous waste repository monitoring system of claim 1, wherein the plurality of radiation measurement instruments are coupled to a downhole conveyance from the terranean surface.

11. The hazardous waste repository monitoring system of claim 10, wherein the downhole conveyance comprises a support and communications wire.

12. The hazardous waste repository monitoring system of claim 10, wherein each of the plurality of radiation measurement instruments is separated from the hazardous waste drillhole by a particular, unique distance through the storage subterranean formation, and each of the plurality of radiation measurement instruments is configured to measure a unique radiation amount emitted from the radioactive hazardous waste in the particular hazardous waste canister.

13. The hazardous waste repository monitoring system of claim 12, comprising a control system communicably coupled to the plurality of radiation measurement instruments through the downhole conveyance, the control system configured to perform operations comprising:

determining a measure of radiation absorption in the storage subterranean formation based on the plurality of unique radiation amounts emitted from the radioactive hazardous waste in the particular hazardous waste canister.

14. A method for monitoring hazardous waste, comprising:

identifying a hazardous waste drillhole formed from a terranean surface into one or more subterranean formations, the hazardous waste drillhole comprising an entry sized to receive a plurality of hazardous waste canisters that enclose radioactive hazardous waste into and through the entry, and a hazardous waste storage area formed in a storage subterranean formation and sized to receive the plurality of hazardous waste canisters;

identifying a probe borehole formed from the terranean surface into the one or more subterranean formations adjacent the hazardous waste drillhole, the probe borehole having a diameter less than a diameter of each of the plurality of hazardous waste canisters; and measuring, with at least one radiation measurement instrument of a plurality of radiation measurement instruments positioned in the probe borehole near the hazardous waste storage area, at least one parameter associated with the hazardous waste;

while measuring, impeding movement of radiation within the probe borehole between adjacent radiation measurement instruments with at least on radiation shield positioned in the probe borehole between the adjacent radiation measurement instruments, wherein the probe borehole is separated from the hazardous waste drillhole by a predetermined distance in the storage subterranean formation that defines a closest approach distance between the hazardous waste drillhole and the probe borehole, the closest approach distance defining an amount of attenuation of radiation from the radioactive hazardous waste between the hazardous waste drillhole and the probe borehole based on the storage subterranean formation.

15. The method of claim 14, wherein the parameter comprises at least one of radioactivity, heat energy, pressure, temperature, salinity, or pH.

16. The method of claim 14, wherein the radioactive hazardous waste comprises high level waste or transuranic (TRU) waste.

17. The method of claim 16, wherein the radioactive hazardous waste comprises spent nuclear fuel.

18. The method of claim 14, wherein the predetermined distance is selected such that a radiation level from the radioactive hazardous waste at the particular radiation measurement instrument is insufficient to damage the particular measurement device over a particular time duration.

19. The method of claim 14, wherein the particular radiation measurement instrument comprises at least one scintillation detector, at least one ionization chamber, at least one proportional detector, or at least one Geiger detector.

20. The method of claim 14, wherein the probe borehole comprises a diameter between 10-20 cm.

21. The method of claim 14, wherein the probe borehole comprises an open hole completion.

22. The method of claim 14, wherein the probe borehole is open at the terranean surface.

23. The method of claim 14, wherein the plurality of radiation measurement instruments are coupled to a downhole conveyance from the terranean surface.

24. The method of claim 23, wherein the downhole conveyance comprises a support and communications wire.

25. The method of claim 23, wherein each of the plurality of radiation measurement instruments is separated from the hazardous waste drillhole by a particular, unique distance through the storage subterranean formation, and the method comprises:

measuring a unique radiation amount emitted from the radioactive hazardous waste in the particular hazardous waste canister with each of the plurality of radiation measurement instruments.

26. The method of claim 25, comprising determining, with a control system communicably coupled to the plurality of radiation measurement instruments through the downhole conveyance, a measure of radiation absorption in the storage subterranean formation based on the plurality of measured unique radiation amounts emitted from the radioactive hazardous waste in the particular hazardous waste canister.

27. The method of claim 14, further comprising forming the hazardous waste drillhole from the terranean surface into one or more subterranean formations and into the storage subterranean formation.

28. The method of claim 14, further comprising forming the probe borehole from the terranean surface into one or more subterranean formations and into the storage subterranean formation.

29. The method of claim 14, further comprising moving the at least one measurement instrument from the terranean surface into the probe borehole and to the storage subterranean formation.

30. A hazardous waste repository monitoring system, comprising:

a hazardous waste drillhole formed from a terranean surface into one or more subterranean formations, the hazardous waste drillhole comprising an entry sized between 28 inches and 60 inches to receive a plurality of hazardous waste canisters that enclose hazardous waste into and through the entry, and a hazardous waste storage area formed in a storage subterranean formation and sized to receive the plurality of hazardous waste canisters, the hazardous waste comprising radioactive waste;

a probe borehole formed from the terranean surface into the one or more subterranean formations adjacent the hazardous waste drillhole, the probe borehole having a diameter of between 4 inches and 8 inches and less than a diameter of each of the plurality of hazardous waste canisters, the probe borehole separated from the hazardous waste drillhole by a distance of between 1 and 3 meters at which a radiation level from the radioactive waste by at least one measurement instrument is attenuated by a portion of the one or more subterranean formations between the hazardous waste drillhole and the probe borehole to be insufficient to damage the at least one measurement device over a particular time duration; and the at least one measurement instrument positioned in the probe borehole near the hazardous waste storage area and configured to measure at least one parameter associated with the hazardous waste.

* * * * *